(12) United States Patent  
Wang et al.

(10) Patent No.: US 12,339,100 B2
(45) Date of Patent: Jun. 24, 2025

(54) AUXILIARY AIMING DEVICE

(71) Applicant: Shenzhen Yixin Information Technology Co., Ltd., Shenzhen (CN)

(72) Inventors: Lei Wang, Shenzhen (CN); Yijiang Hou, Shenzhen (CN); Wei Yu, Shenzhen (CN)

(73) Assignee: Shenzhen Yixin Information Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/605,723

(22) Filed: Mar. 14, 2024

(65) Prior Publication Data

US 2024/0219147 A1  Jul. 4, 2024

(51) Int. Cl.
*F41G 3/08* (2006.01)
*F41G 3/06* (2006.01)
*G01P 3/36* (2006.01)

(52) U.S. Cl.
CPC .............. *F41G 3/08* (2013.01); *F41G 3/06* (2013.01); *G01P 3/36* (2013.01)

(58) Field of Classification Search
CPC ..... F41G 3/08; F41G 3/14; F41G 3/06; G01P 3/36
See application file for complete search history.

(56) References Cited

U.S. PATENT DOCUMENTS

| | | | | |
|---|---|---|---|---|
| 6,269,581 B1* | 8/2001 | Groh | ......................... | F41G 3/06 |
| | | | | 42/122 |
| 8,651,381 B2* | 2/2014 | Rudich | ................... | F41G 3/142 |
| | | | | 235/407 |
| 10,502,527 B2* | 12/2019 | Kleck | ....................... | F41G 3/06 |
| 2005/0268521 A1* | 12/2005 | Cox | ........................... | F41G 3/06 |
| | | | | 42/130 |
| 2012/0118955 A1* | 5/2012 | Cox | ........................... | F41G 3/08 |
| | | | | 235/404 |
| 2012/0126002 A1* | 5/2012 | Rudich | ..................... | F41G 1/54 |
| | | | | 235/404 |
| 2015/0323286 A1* | 11/2015 | Theriault | ................ | F41C 27/22 |
| | | | | 42/111 |
| 2018/0039061 A1* | 2/2018 | Hairston | ................ | G02B 23/04 |
| 2018/0172404 A1* | 6/2018 | Kleck | ..................... | F41G 3/065 |
| 2018/0196628 A1* | 7/2018 | Samo | ........................ | F41A 9/62 |
| 2019/0242676 A1 | 8/2019 | Belenkii | | |

(Continued)

FOREIGN PATENT DOCUMENTS

CN          117663902 A       3/2024

*Primary Examiner* — Benjamin P Lee

(57) ABSTRACT

An auxiliary aiming device includes a main body, a digital sight with a digital rearsight, and a ballistic compensation system. The digital sight and the ballistic compensation system are arranged at the main body. The ballistic compensation system includes a range finder, a main control unit, an image processor, an image sensor and a display device. The range finder is configured to measure the target distance data of a shooting target and send the target distance data to the main control unit. The main control unit is configured to calculate a ballistic compensation based on the target distance data and a calibrated data scale, send the ballistic compensation to the image processor, and superimpose a recommended aiming position from the image processor onto a target image which is displayed on the display device. The image sensor is configured to obtain a target image.

4 Claims, 3 Drawing Sheets

(56) References Cited

U.S. PATENT DOCUMENTS

2020/0018566 A1* 1/2020 Tubb .................. F41G 1/38
2024/0377165 A1* 11/2024 Bian .................. G02B 25/001
2025/0012547 A1* 1/2025 Ehrlich ................ F41G 3/165

* cited by examiner

AUXILIARY AIMING DEVICE

TECHNICAL FIELD

This application relates generally to auxiliary aiming, and more particularly to an auxiliary aiming device.

BACKGROUND

For naked eyes or optical sights, the traditional auxiliary aiming devices generally adopt a mechanical rearsight for ballistic compensation. Calibration of the mechanical rearsight is completed based on the performance of the auxiliary aiming device and parameters of the matched ammunition during the design and manufacture stage. The mechanical rearsight can be adjusted according to the shooting distance, such that a shooter can adjust the position of the mechanical scale based on the estimated shooting distance to complete the ballistic compensation.

In the practical application, the ammunition of the same caliber may even vary in performance, but the existing mechanical rearsights cannot be adjusted to adapt to different types of ammunition, resulting in differences in the ballistic compensation at longer shooting distances. In order to solve the problem, an auxiliary aiming device is provided.

SUMMARY

In order to solve the technical problems existing in the prior art, the disclosure provides an auxiliary aiming device.

To achieve the above object, the present disclosure provides the following technical solutions.

The present disclosure provides an auxiliary aiming device, comprising:
  a main body;
  a digital sight; and
  a ballistic compensation system;
  wherein the digital sight and the ballistic compensation system are arranged at the main body;
  the digital sight has a digital rearsight;
  the ballistic compensation system comprises a range finder, a main control unit, an image processor, an image sensor and a display device;
  the range finder is configured to measure a plurality of target distance data of the plurality of shooting targets and send the plurality of target distance data to the main control unit;
  the main control unit is configured to calculate a ballistic compensation based on the plurality of target distance data and a calibrated data scale, and send the ballistic compensation to the image processor;
  the image sensor is configured to obtain a target image;
  the image processor is configured to send a recommended aiming position to the main control unit based on the ballistic compensation;
  the main control unit is further configured to superimpose the recommended aiming position from the image processor onto the target image;
  the display device is configured to display the target image superimposed with the recommended aiming position; and
  the range finder, the image sensor and the display device are all connected to the main control unit.

The technical solutions provided herein have the following beneficial effects.

The digital rearsight in the present disclosure solves the defect of inflexible adjustment of mechanical rearsights in the prior art and can accommodate different types of ammunition. With certain universality, the digital sight in the present disclosure can be suitable for different types of auxiliary aiming devices and ammunition. In addition, it can solve the deviation in the process of installation, low adaptability and inconvenient of dense lines or digital rearsights at fixed positions. Combining distance measurement function and automatic ballistic compensation indication for shooters, the present disclosure significantly reduces the estimation difficulties of ballistic compensation in the design process and experience requirements for shooters.

These or other aspects of the present disclosure will be more clearly understood in the following description of the embodiments. It should be understood that the foregoing general description and the following detailed description are merely exemplary and explanatory, and do not limit the present disclosure.

BRIEF DESCRIPTION OF THE DRAWINGS

In order to more clearly illustrate the technical solutions in the embodiments of the present disclosure or in the prior art, the accompanying drawings needed in the description of the embodiments or the prior art will be briefly described below. Obviously, presented in the accompanying drawings are only some embodiments of the present disclosure. Other embodiments may also be obtained by those skilled in the art according to these accompanying drawings without making creative effort.

In the figures: 100—ballistic compensation system; 10—range finder; 20—main control unit; 30—image sensor; 40—display device; 50—attitude sensor; 60—ocular optical system; and 70—objective optical system.

DETAILED DESCRIPTION OF EMBODIMENTS

The technical solutions in the embodiments of the present disclosure will be clearly and completely described below with reference to the accompanying drawings. Obviously, described below are merely some, but not all, embodiments of the present disclosure. Based on the embodiments provided herein, all other embodiments obtained by those skilled in the art without making creative efforts shall fall within the scope of the present disclosure.

The flowcharts shown in the figures are merely illustrative, and do not necessarily include all content and operations/steps, nor are they necessarily executed in the described orders. For example, some operations/steps may also be decomposed, combined, or partially merged, so the actual execution orders may be changed according to actual situations.

It should be understood that the terminology used in this specification is illustrative for the description of particular embodiments only, and is not intended to limit the disclosure. As used herein, the singular forms "a," "an," and "the" are intended to include the plural form unless otherwise clearly indicated.

Specifically, embodiments of the present disclosure are further described below with reference to the accompanying drawings.

Figure 1:
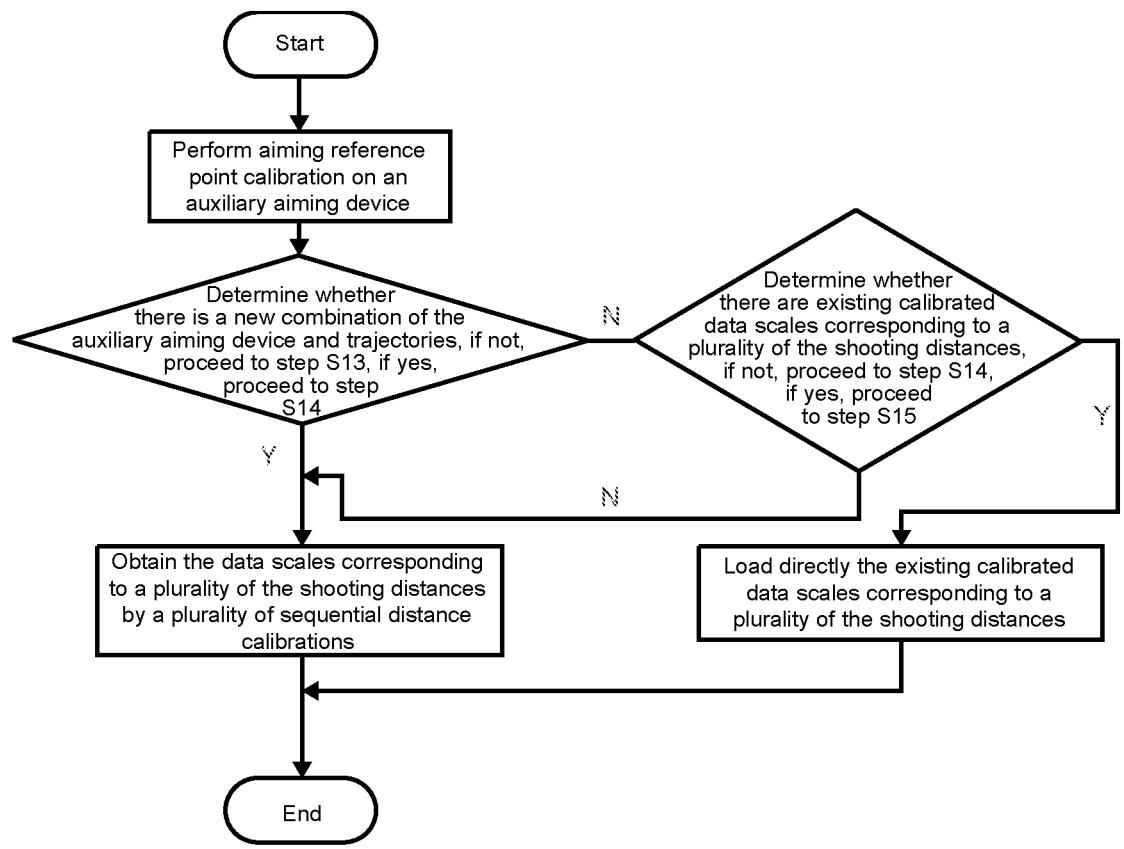
FIG. 1 is a flowchart of a method for calibrating a digital rearsight in an auxiliary aiming device according to an embodiment of the present disclosure.
Figure 2:
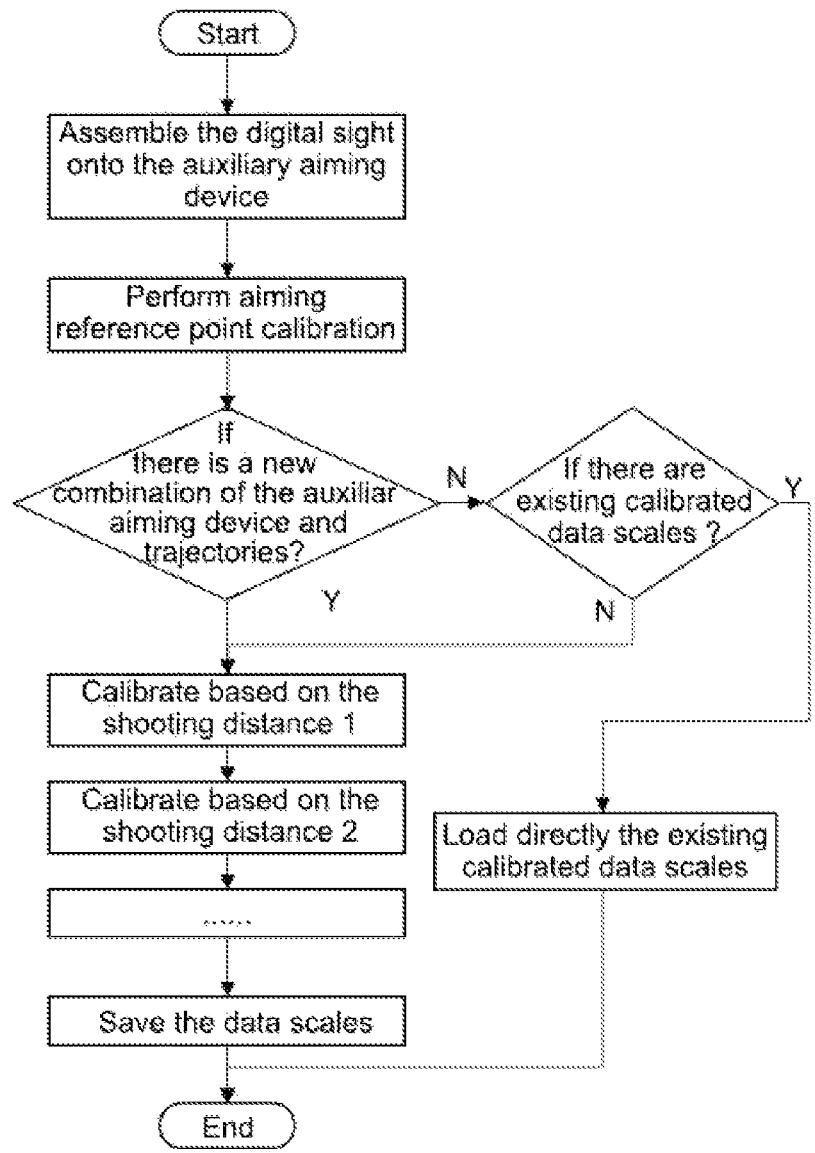
FIG. 2 is a specific flow chart of a digital rearsight calibration method according to an embodiment of the present disclosure.

A digital rearsight calibration method according to one embodiment is shown in FIGS. 1 and 2. FIG. 1 is a flowchart of a method for calibrating a digital rearsight in an auxiliary aiming device according to an embodiment of the present disclosure. An embodiment of the present disclosure further provides an auxiliary aiming device. The auxiliary aiming device includes a main body and a digital sight arranged at the main body. The digital sight includes a digital rearsight. The digital rearsight calibration method is performed through the following steps.

(S11) An aiming reference point is calibrated for the auxiliary aiming device.

It should be noted that, before step (S11), the method may further include the step of assembling the digital sight onto the auxiliary aiming device.

Further, the step (S11) includes the following sub-steps, including steps (S111), (S112) and (S113).

(S111) An effective distance is set, which may be 50 meters or 100 meters.

(S112) The shooting action is performed based on the effective distance after the auxiliary aiming device is fixed.

(S113) A reference point of the digital rearsight is moved to a center position of an impact point in the display device of the digital sight, and a position of the reference point is confirmed and saved.

(S12) Whether there is a new combination of the auxiliary aiming device and a ballistic trajectory is determined. If not, the step (S13) is performed; otherwise, the step (S14) is executed.

(S13) Whether there are calibrated data scales corresponding to the plurality of shooting distances is determined. If not, the step (S14) is performed, otherwise, the step (S15) is executed.

(S14) The calibration for the plurality of shooting distances is sequentially performed, and the calibrated data scales corresponding to the plurality of shooting distances are obtained.

Further, the step (S14) includes the following sub-steps. Firstly, the plurality of shooting distances are obtained. Then the auxiliary aiming device is fixed to shoot based on the plurality of shooting distances. After a baseline of a corresponding digital rearsight is moved to a center position of an impact point in the display device of the digital sight, and a position of the baseline is obtained and saved. Finally, the calibrated data scales corresponding to the plurality of shooting distances are obtained based on the position of the baseline.

In this way, the calibration of the position of the baseline is repeated at different shooting distances, and then the digital rearsight is saved and activated.

(S15) The calibrated data scales corresponding to the plurality of shooting distances are loaded.

The calibration of the reference point and the baseline is a critical step in above steps, while other steps can be adjusted according to specific circumstances.

It should be noted that if a calibrated combination of the auxiliary aiming device and a ballistic trajectory has already been set up at the digital sight, the option to load previously calibrated digital rearsight or to perform a complete calibration can be chosen.

It should be noted that the calibrated digital rearsight is presented on the display device 40 in an appropriate manner for the shooter to aim.

The existing optical sights and previous digital sights have adopted reticles to assist the shooter in the estimation of target distance, and ballistic compensation based on the deviation between the impact point and the aiming point. However, it puts forward higher requirements for the shooter on the experience, memory and rapid estimation, resulting in inconvenient use of existing optical sights and early digital sights. The digital rearsight in the present disclosure solves the defect of inflexible adjustment of mechanical rearsights in the prior art and can accommodate different types of ammunition. With certain universality, the digital sight in the present disclosure can be suitable for different types of auxiliary aiming devices and ammunition. In addition, it can solve the deviation in the process of installation, low adaptability and inconvenient of dense lines or digital rearsights at fixed position.

According to the method of the digital rearsight calibration provided by the present disclosure, the shooter can quickly complete the rearsight calibration with the auxiliary aiming device and the ammunition at hand, which greatly enhances the adaptability of the digital sight to the auxiliary aiming device and the ammunition.

It should be understood that although described in the above order, these steps are not necessarily performed in the order described above. Unless explicitly stated herein, these steps may be executed in other orders rather than in the order limited by the above description. Moreover, part of the steps in these embodiments may include a plurality of steps or stages, which do not necessarily have to be completed at the same time. Instead, they can be executed at different times. The order of execution for these steps or stages is also not necessarily sequential, but they can be performed alternately or interchangeably with at least a portion of other steps or stages in the process.

Figure 3:
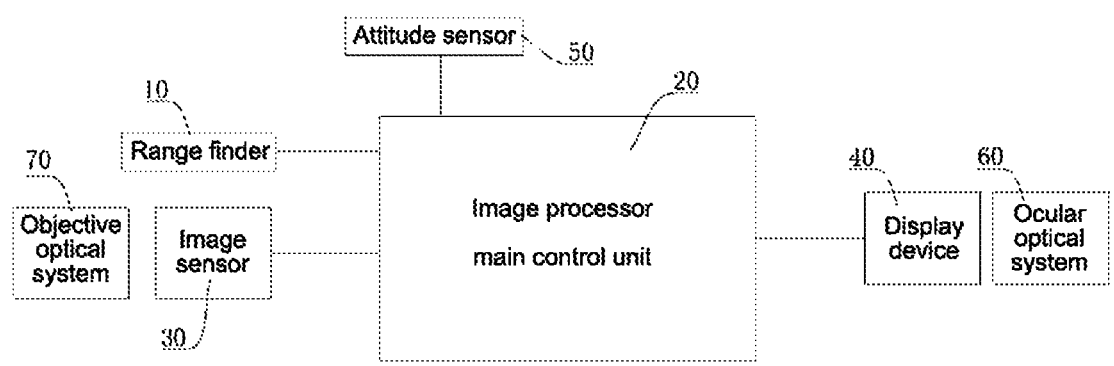
FIG. 3 is a logical block diagram of a ballistic compensation system in the auxiliary aiming device according to an embodiment of the present disclosure.

FIG. 3 is a logical structural block diagram of a ballistic compensation system in the auxiliary aiming device according to an embodiment of the present disclosure. The auxiliary aiming device in the present disclosure includes the ballistic compensation system 100 which further includes a range finder 10, a main control unit 20, an image sensor 30, an image processor and a display device 40. The range finder 10, the image sensor 30 and the display device 40 are all connected to the main control unit 20.

The range finder 10 is configured to measure a plurality of target distance data of the plurality of shooting targets and send the plurality of target distance data to the main control unit 20.

The main control unit 20 is configured to calculate the ballistic compensation based on the plurality of target distance data and the calibrated data scale, send the ballistic compensation to the image processor, and superimpose a recommended aiming position from the image processor onto a target image.

The display device 40 is configured to display the target image superimposed with the recommended aiming position.

The image sensor 30 is configured to obtain the target image.

In an embodiment of the present disclosure, the main control unit 20 is also configured to perform the following steps. When the shooting target is in motion or the shooting target is arranged in a plurality, the main board unit 20 controls the range finder 10 to perform a plurality of distance measurements on the shooting target in motion or a plurality of shooting targets at intervals to obtain the plurality of target distance data. Then the main board unit 20 calculates the ballistic compensations based on the plurality of target distance data and the calibrated data scales respectively corresponding to the plurality of target distance data, and saves and sends the ballistic compensations to the image processor. Finally, the main control unit 20 superimposes the recommended aiming position from the image processor onto the target image. This allows the shooter to quickly commence shooting after determining the shooting targets and avoids the dissipation and power loss of the range finder 10 by continuous distance measurement as well as the interference from the range finder 10 on the scene. In an embodiment of the present disclosure, the display device 40 is configured to highlight the recommended aiming position. The image processor is configured to send the recommended aiming position based on the ballistic compensation to the main control unit 20. Consequently, the shooter can make shooting decisions based on the recommended result of the ballistic compensation.

Combining distance measurement function and automatic ballistic compensation indication for shooters, the present disclosure significantly reduces the estimation difficulties of ballistic compensation in the design stage and experience requirement for shooters.

The ballistic compensation system 100 further includes an attitude sensor 50 provided in the digital sight and connected to the main control unit 20. The attitude sensor 50 is configured to generate a control signal by identifying specific attitudes and send it to the main control unit 20. The main control unit 20 then initiates distance measurement, stops the distance measurement, or activates an automatic ballistic compensation function based on the control signal.

In some embodiments, when the digital sight experiences a roll motion during use, such as a roll of more than 30 degrees and returning to normal in a short period, the distance measurement is turned on or off, and the automatic ballistic compensation is performed.

Due to the attitude sensor 50, the present disclosure enables the distance measurement and an automatic ballistic compensation function with minimum motion cost, without affecting continuous observation. This ensures the endurance of equipment and greatly improves the practicality of the distance measurement function.

It should be noted that the distance measurement and the automatic ballistic compensation function can also be activated and deactivated by buttons or software settings.

It should be noted that the ballistic compensation system 100 further includes an optical system which includes an ocular optical system 60 and an objective optical system 70.

It should be understood that, as used herein, the singular form "a" is intended to include the plural forms as well, unless the context clearly supports the exception. It should also be understood that "and/or" as used herein refers to any and all possible combinations of one or more relative listed items. The sequence numbers of the embodiments disclosed in the foregoing embodiments of the present disclosure are merely for description, and do not represent the advantages and disadvantages of the embodiments.

What is claimed is:

1. A method for calibrating a digital rearsight of an auxiliary aiming device, wherein the auxiliary aiming device comprises:
   a main body:
   a digital sight; and
   a ballistic compensation system;
   wherein the digital sight and the ballistic compensation system are arranged at the main body;
   the digital sight has the digital rearsight;
   the ballistic compensation system comprises a range finder, a main control unit, an image processor, an image sensor and a display device;
   the range finder is configured to measure a plurality of target distance data of the plurality of shooting targets and send the plurality of target distance data to the main control unit;
   the main control unit is configured to calculate a ballistic compensation based on the plurality of target distance data and a calibrated data scale, and send the ballistic compensation to the image processor;
   the image sensor is configured to obtain a target image;
   the image processor is configured to send a recommended aiming position to the main control unit based on the ballistic compensation;
   the main control unit is further configured to superimpose the recommended aiming position from the image processor onto the target image;
   the display device is configured to display the target image superimposed with the recommended aiming position; and
   the range finder, the image processor and the display device are all connected to the main control unit; and
   the method comprises:
   (S11) calibrating an aiming reference point of the auxiliary aiming device;
   (S12) determining whether there is a new combination of the auxiliary aiming device and a ballistic trajectory, if not, proceeding to step (S13), if yes, proceeding to step (S14);
   (S13) determining whether there are calibrated data scales corresponding to a plurality of shooting distances, if not, proceeding to step (S14), if yes, proceeding to step (S15);
   (S14) sequentially performing calibration for the plurality of shooting distances to obtain the calibrated data scales corresponding to the plurality of shooting distances; and
   (S15) loading the calibrated data scales corresponding to the plurality of shooting distances.

2. The method of claim 1, further comprising:
   assembling the digital sight onto the auxiliary aiming device prior to the step (S11).

3. The method of claim 1, wherein the step (S11) comprises:
   (S111) setting an effective distance;
   (S112) fixing the auxiliary aiming device, and performing shooting based on the effective distance; and
   (S113) moving a reference point of the digital rearsight to a center position of an impact point in the display device of the digital sight, and confirming and saving a position of the reference point.

4. The method of claim 1, wherein the step (S14) comprises:
   obtaining the plurality of shooting distances;
   fixing the auxiliary aiming device to perform shooting based on the plurality of shooting distances;
   moving a baseline of a corresponding digital rearsight to a center position of an impact point in the display device of the digital sight, and saving a position of the baseline; and
   obtaining the calibrated data scales corresponding to the plurality of shooting distances based on the position of the baseline.

* * * * *